United States Patent
Sato et al.

(10) Patent No.: US 9,227,382 B2
(45) Date of Patent: Jan. 5, 2016

(54) RELEASE SHEET

(71) Applicant: LINTEC CORPORATION, Tokyo (JP)

(72) Inventors: Keiichi Sato, Tokyo (JP); Tomomi Fukaya, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 14/387,265

(22) PCT Filed: Dec. 20, 2012

(86) PCT No.: PCT/JP2012/083127
§ 371 (c)(1),
(2) Date: Sep. 23, 2014

(87) PCT Pub. No.: WO2013/145476
PCT Pub. Date: Oct. 3, 2013

(65) Prior Publication Data
US 2015/0119512 A1    Apr. 30, 2015

(30) Foreign Application Priority Data
Mar. 27, 2012    (JP) .................................. 2012-071912

(51) Int. Cl.
| | |
|---|---|
| *B32B 9/04* | (2006.01) |
| *B32B 27/28* | (2006.01) |
| *C09D 183/04* | (2006.01) |
| *C08J 7/04* | (2006.01) |
| *C09J 7/02* | (2006.01) |
| *C08K 5/54* | (2006.01) |
| *C08G 77/12* | (2006.01) |
| *C08G 77/20* | (2006.01) |

(52) U.S. Cl.
CPC ............... *B32B 27/283* (2013.01); *C08J 7/047* (2013.01); *C08K 5/54* (2013.01); *C09D 183/04* (2013.01); *C09J 7/0228* (2013.01); *C08G 77/12* (2013.01); *C08G 77/20* (2013.01); *C08J 2367/02* (2013.01); *C08J 2483/04* (2013.01); *C09J 2467/006* (2013.01); *C09J 2483/005* (2013.01)

(58) Field of Classification Search
None
See application file for complete search history.

(56) References Cited

U.S. PATENT DOCUMENTS

| 4,609,574 | A * | 9/1986 | Keryk et al. ................ 427/407.1 |
| 5,520,978 | A * | 5/1996 | Boardman et al. ........... 428/41.9 |
| 2005/0053793 | A1 * | 3/2005 | Benay-Oun et al. .......... 428/447 |
| 2011/0274935 | A1 * | 11/2011 | Yamamoto et al. ........... 428/447 |

FOREIGN PATENT DOCUMENTS

| JP | 06-093183 A | 4/1994 |
| JP | 2005-314510 A | 11/2005 |
| JP | 2005-343974 A | 12/2005 |
| JP | 2007-308865 A | 11/2007 |

OTHER PUBLICATIONS

International Search Report of the International Searching Authority mailed Apr. 2, 2013 for the corresponding international application No. PCT/JP2012/083127 (and English translation).

* cited by examiner

*Primary Examiner* — Marc Zimmer
(74) *Attorney, Agent, or Firm* — Posz Law Group, PLC

(57) ABSTRACT

A release sheet comprising a base material and a release agent layer formed on at least one surface of the base material, wherein: the release agent layer is formed by using a release agent composition; the release agent composition contains a first polydimethylsiloxane having at least two alkenyl groups in one molecule and a second polydimethylsiloxane having at least two hydrosilyl groups in one molecule; the release agent composition contains 10.00 to 16.00 mmol of the alkenyl groups and 40.00 to 145.00 mmol of the hydrosilyl groups in a total of 30 g of the first polydimethylsiloxane and the second polydimethylsiloxane; and a molar ratio (b/a) of the hydrosilyl groups (b) to the alkenyl groups (a) is 2.0 to 15.0. According to the release sheet, it is possible to suppress the peeling force from increasing even when the release agent layer of the release sheet is exposed to the air for a long time.

7 Claims, 1 Drawing Sheet

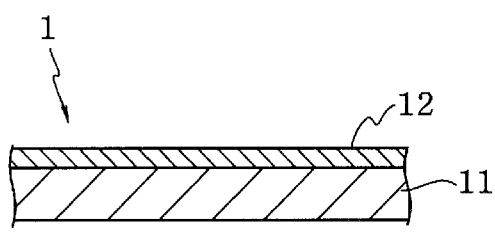

RELEASE SHEET

CROSS REFERENCE TO RELATED APPLICATIONS

This application is a U.S. national stage application of PCT/JP2012/083127 filed on Dec. 20, 2012, and claims priority to, and incorporates by reference, Japanese Patent Application No. 2012-071912 filed on Mar. 27, 2012.

TECHNICAL FIELD

The present invention relates to a release sheet on which a pressure sensitive adhesive layer of a pressure sensitive adhesive sheet or the like is laminated.

BACKGROUND ART

For a pressure sensitive adhesive sheet, a release sheet is generally used which comprises a base material and a release agent layer formed on one surface of the base material (e.g., Patent Literature 1). Many of release sheets for a pressure sensitive adhesive sheet are usually used such that, after a pressure sensitive adhesive is coated and dried on a substrate which is being carried in a roll-to-roll manner, the release agent layer surface of the release sheet is attached to the surface of the obtained pressure sensitive adhesive layer. When a pressure sensitive adhesive sheet is produced in a roll-to-roll manner, the carrying speed from the roll may be constant, so that the release sheet is unlikely to be exposed to the air for a long time. As for the release sheet, in a pre-process of attaching the pressure sensitive adhesive layer of the pressure sensitive adhesive sheet and the release agent layer of the release sheet together, back-split processing (cut or half-cut) or the like may be performed for the release sheet.

When the processing as the above is performed, the release agent layer of the release sheet may be exposed to the air for a long time. If the release agent layer of the release sheet is exposed to the air for a long time in this way, there is a problem in that the peeling force of the release agent layer from the pressure sensitive adhesive layer becomes larger than that before the exposure to the air. In particular, as the peeling force increases such as in a sheet having tight releasability, the increase in the peeling force due to exposure to the air tends to be remarkable.

The increased peeling force of the release sheet as the above may cause release failure to occur when the release sheet is peeled off from the pressure sensitive adhesive sheet after the pressure sensitive adhesive layer of the pressure sensitive adhesive sheet and the release agent layer of the release sheet are attached together.

PRIOR ART LITERATURE

Patent Literature

[Patent Literature 1] JP2002-363515A

SUMMARY OF THE INVENTION

Problems to be Solved by the Invention

The reason for the above increased peeling force due to exposure to the air is not necessarily sure, but this is considered to be mainly because dust and dirt or the like contained in the air become attached to the release agent layer.

The present invention has been made in consideration of such actual circumstances, and an object of the present invention is to provide a release sheet which can suppress the peeling force from increasing even when the release agent layer of the release sheet is exposed to the air for a long time.

Means for Solving the Problems

To achieve the above object, the present invention provides a release sheet comprising a base material and a release agent layer formed on at least one surface of the base material, the release sheet being characterized in that: the release agent layer is formed using a release agent composition; the release agent composition contains a first polydimethylsiloxane having at least two alkenyl groups in one molecule and a second polydimethylsiloxane having at least two hydrosilyl groups in one molecule; the release agent composition contains 10.00 to 16.00 mmol of the alkenyl groups and 40.00 to 145.00 mmol of the hydrosilyl groups in a total of 30 g of the first polydimethylsiloxane and the second polydimethylsiloxane; and a molar ratio (b/a) of the hydrosilyl groups (b) to the alkenyl groups (a) is 2.0 to 15.0 (Invention 1).

According to the above invention (Invention 1), it is possible to suppress the peeling force from increasing thereby to reduce release failure at the time of peeling off the release sheet from a pressure sensitive adhesive sheet even when the release agent layer of the release sheet is exposed to the air for a long time.

In the above invention (Invention 1), it is preferable that a weight-average molecular weight of the first polydimethylsiloxane is 200,000 to 1,300,000 and a weight-average molecular weight of the second polydimethylsiloxane is 300 to 1,200 (Invention 2).

In the above invention (Inventions 1, 2), it is preferable that the release agent composition further contains a platinum-group metal-based compound as a catalyst (Invention 3).

In the above invention (Inventions 1 to 3), it is preferable that a peeling force rate of change represented by {(peeling force Y−peeling force X)/peeling force X}×100 is 30% or less, where the peeling force X is a 180° peeling force (mN/20 mm) of a polyester pressure sensitive adhesive tape No. 31B available from Nitto Denko Corporation from the release sheet in a state of no exposure to air, and the peeling force Y is a 180° peeling force (mN/20 mm) of a polyester pressure sensitive adhesive tape No. 31B available from Nitto Denko Corporation from the release sheet which has been exposed to air for 7 days in a clean room under a condition of class 10,000 (ISO class 7), a temperature of 23° C. and a humidity of 50% RH (Invention 4).

Advantageous Effect of the Invention

According to the release sheet of the present invention, it is possible to suppress the peeling force from increasing even when the release agent layer of the release sheet is exposed to the air for a long time. This reduces release failure at the time of peeling off the release sheet from a pressure sensitive adhesive sheet.

BRIEF DESCRIPTION OF DRAWING(S)

FIG. 1 is a cross-sectional view of a release sheet according to one embodiment of the present invention.

EMBODIMENTS FOR CARRYING OUT THE INVENTION

Embodiments of the present invention will hereinafter be described.

As shown in FIG. 1, a release sheet 1 according to the present embodiment is configured to comprise a base material 11 and a release agent layer 12 formed on one surface of the base material 11.

The base material 11 to be used is not particularly limited, and may appropriately be selected from any of conventionally known ones. Examples of such base material 11 include a film formed of plastic, such as polyethylene terephthalate, polyethylene naphthalate and other polyester, polypropylene, polymethylpentene and other polyolefin, polycarbonate, and polyvinyl acetate, which may be a single layer, or may be multilayer of two or more layers of the same type or different types. Among them, a polyester film is preferable, a polyethylene terephthalate film is more preferable, and a biaxial stretched polyethylene terephthalate film is most preferable.

If necessary, either one surface or both surfaces of the base material 11 comprising a film as described above may be subjected to surface treatment such as using oxidation method and roughening method or primer treatment for the purpose of improving the interfacial adhesion with the release agent layer 12 to be provided on the surface. Examples of the above oxidation method include corona discharge treatment, plasma discharge treatment, chromium oxidation treatment (wet type), flame treatment, hot-air treatment, ozone exposure treatment, and ultraviolet irradiation treatment. Examples of the roughening method include sandblasting method and thermal spraying method. These surface treatment methods may be appropriately selected depending on the type of the base material film, and the corona discharge treatment method may preferably be used in view of the effect and the operability in general.

Other than the film as described above, papers such as glassine paper, clay-coated paper, resin-coated paper and laminated paper (such as polyethylene laminated paper and polypropylene laminated paper), non-woven cloth, metal foil and the like may also be used as the base material 11.

The thickness of the base material 11 may ordinarily be 10 to 300 μm, preferably 15 to 200 μm, and particularly preferably 20 to 125 μm.

The release agent layer 12 in the present embodiment is formed using a release agent composition as below. The release agent composition in the present embodiment contains, as addition reaction-type silicone resins, a first polydimethylsiloxane having at least two alkenyl groups in one molecule and a second polydimethylsiloxane having at least two hydrosilyl groups in one molecule.

Examples of the alkenyl groups contained in the first polydimethylsiloxane include monovalent hydrocarbon groups such as vinyl group, allyl group, propenyl group, butenyl group, pentenyl group, hexenyl group, heptenyl group and octenyl group, among which vinyl group is particularly preferable.

A total of 30 g of the first polydimethylsiloxane and the second polydimethylsiloxane contains 10.00 to 16.00 mmol of the alkenyl groups, and may preferably contain 11.00 to 15.80 mmol of the alkenyl groups. A total of 30 g of the first polydimethylsiloxane and the second polydimethylsiloxane contains 40.00 to 145.00 mmol of the hydrosilyl groups, and may preferably contain 43.00 to 142.00 mmol of the hydrosilyl groups. A molar ratio (b/a) of the hydrosilyl groups (b) to the alkenyl groups (a) is 2.0 to 15.0, and may preferably be 2.5 to 13.0.

By forming the release agent layer 12 using a release agent composition that satisfies the above conditions, the release agent layer 12 is suppressed from increasing the peeling force even when the release agent layer 12 is exposed to the air for a long time. The reason for this is not necessarily sure, but this is considered to be because the release agent layer 12 formed using the release agent composition satisfying the above conditions has a low polarity, so that dust and dirt or the like, which have a high polarity, are unlikely to attach to the release agent layer 12.

When the amount of the alkenyl groups is less than 0.40 mmol or if the amount of the hydrosilyl groups is less than 7.00 mmol in a total of 30 g of the first polydimethylsiloxane and the second polydimethylsiloxane, insufficient curing of the release agent composition may occur to lead to a problem in that the silicone transfers to a coating machine, the pressure sensitive adhesive layer of the pressure sensitive adhesive sheet and the like, and further the releasability will be affected.

If, on the other hand, the relation of the molar ratio (b/a) of the hydrosilyl groups (b) to the alkenyl groups (a) in the total of 30 g of the first polydimethylsiloxane and the second polydimethylsiloxane is not within the above range, there may occur a problem in that the peeling force of the release agent layer 12 from the pressure sensitive adhesive layer becomes larger than that before exposure to the air under a condition where the release sheet 1 is exposed to the air for a long time. If the adding amount of the second polydimethylsiloxane of a low molecular weight having the hydrosilyl groups is large, the viscosity of the coating liquid decreases, so that there may be a problem in that cissing occurs at the coating surface of the release agent when the release sheet 1 is manufactured, and a problem in that the pressure sensitive adhesive is cohesive failure and/or transferred to the side of the release sheet 1 because the peeling force of the release agent layer 12 from the pressure sensitive adhesive layer becomes large.

The first polydimethylsiloxane may preferably contain no hydrosilyl group, and the second polydimethylsiloxane may preferably contain no alkenyl group.

The weight-average molecular weight of the first polydimethylsiloxane may preferably be 20,000 to 1,300,000, and particularly preferably 300,000 to 1,200,000. The weight-average molecular weight of the second polydimethylsiloxane may preferably be 300 to 1,400, and particularly preferably 500 to 1,200. The weight-average molecular weight as used herein is a converted value in terms of polystyrene measured by using a gel permeation chromatography (GPC) method.

The above release agent composition may preferably contain a catalyst. The catalyst is not particularly limited so long as it can cure the release agent composition according to the present embodiment, but a platinum-group metal-based compound may be preferable. Examples of the platinum-group metal-based compound include fine particle-like platinum, fine particle-like platinum adsorbed on carbon powder carrier, chloroplatinic acid, alcohol modified chloroplatinic acid, olefin complex of chloroplatinic acid, palladium, and rhodium. The release agent composition may contain such a catalyst thereby allowing to more efficiently progress the curing reaction of the release agent composition.

It may be preferable that the content of the catalyst in the above release agent composition is about 1 to 1,000 ppm with respect to the total amount of components other than the catalyst.

The above release agent composition may contain reaction inhibitor, adhesion improving agent or the like in addition to the first polydimethylsiloxane, the second polydimethylsiloxane and the catalyst.

The thickness (basis weight) of the release agent layer 12 is not particularly limited but may preferably be 0.01 to 3 $g/m^2$, and particularly preferably 0.05 to 2 $g/m^2$. If the thickness of the release agent layer 12 is less than 0.01 $g/m^2$, the functionality as the release agent layer 12 may not be sufficiently brought out depending on materials that constitute the release agent layer 12, etc. If the thickness of the release agent layer 12 exceeds 3 g/m$^2$, blocking may occur when the release sheet 1 is wound in a roll form, possibly resulting in some troubles at the time of unwinding.

The release agent layer 12 can be formed by applying a coating liquid, which contains the release agent composition and a desired diluent, to one surface of the base material 11 and thereafter drying the coating liquid and curing it. Examples of coating method to be used include gravure-coating method, bar-coating method, spray-coating method, spin-coating method, knife-coating method, roll-coating method, and die-coating method.

The above diluent is not particularly limited, and various types may be used. Examples of the diluents include hydrocarbon compounds, such as toluene, hexane and heptane, as well as acetone, ethyl acetate, methyl ethyl ketone, methyl isobutyl ketone, and mixture thereof.

It may be preferable that the release agent composition coated in the above manner is thermally cured. In this case, the heating temperature may preferably be 80° C. to 180° C., and the heating time may preferably be about 10 to 90 seconds.

As previously described, according to the release sheet 1 of the present embodiment, it is possible to suppress the peeling force from increasing even when the release agent layer 12 of the release sheet 1 is exposed to the air for a long time. Specifically, a peeling force rate of change represented by {(peeling force Y−peeling force X)/peeling force X}×100 may preferably be 30% or less, particularly preferably 25% or less, further preferably 15% or less, and most preferably 10% or less, where the peeling force X is a 180° peeling force (mN/20 mm) of a polyester pressure sensitive adhesive tape No. 31B available from Nitto Denko Corporation from the release sheet 1 in a state of no exposure to the air, and the peeling force Y is a 180° peeling force (mN/20 mm) of a polyester pressure sensitive adhesive tape No. 31B available from Nitto Denko Corporation from the release sheet 1 which has been exposed to the air for 7 days in a clean room under a condition of class 10,000 (ISO class 7), a temperature of 23° C. and a humidity of 50% RH. In order that the peeling force is not unduly reduced, the peeling force rate of change may preferably be −30% or more.

In the above clean room, the release sheet 1 is to be suspended in the vertical direction to the ground surface when the release sheet 1 is exposed to the air. If the exposure is such that the release sheet 1 is not suspended in the vertical direction to the ground surface, there may be a possibility that the measurement of the peeling force is affected by dust or dirt when the dust or dirt is deposited on the surface of the release agent layer 12, so that the peeling force is unstable, because some dust and dirt are present even in a clean room.

The peeling force rate of change of the release sheet 1 may be the above value or less thereby to reduce the release failure when the release sheet 1 is peeled off from the pressure sensitive adhesive sheet after the pressure sensitive adhesive layer of the pressure sensitive adhesive sheet and the release agent layer 12 of the release sheet 1 are attached together.

It should be appreciated that the embodiments heretofore explained are described to facilitate understanding of the present invention and are not described to limit the present invention. Therefore, it is intended that the elements disclosed in the above embodiments include all design changes and equivalents to fall within the technical scope of the present invention.

For example, one or more other layers such as an antistatic layer may be provided on the opposite surface to the release agent layer 12 of the base material 11 and/or between the base material 11 and the release agent layer 12.

EXAMPLES

The present invention will hereinafter be described further specifically with reference to examples, etc, but the scope of the present invention is not limited to these examples, etc.

Example 1

A mixture of vinyl-modified silicone resin having at least two vinyl groups in the structure of polydimethylsiloxane (weight-average molecular weight: 1,100,000) as the first polydimethylsiloxane, polymethylhydrogensiloxane having at least two hydrosilyl groups in the structure of polydimethylsiloxane (weight-average molecular weight: 1,000) as the second polydimethylsiloxane, and vinyl-modified silicone resin having at least two vinyl groups in the structure of silicone resin (weight-average molecular weight: 10,000), was prepared as an addition reaction-type organopolysiloxane (release agent composition A) having a weight-average molecular weight of 501,000. The release agent composition A was diluted using toluene so that the solid content would be 30 mass %, and a silicone resin solution was thus prepared. A coating liquid was obtained by adding 2 mass parts of a platinum-based catalyst (BY24-835 available from Dow Corning Toray Co., Ltd.) to 100 mass parts of that silicone resin solution and performing adjustment using toluene such that the concentration of the solid content would be 1.5 mass %.

The obtained coating liquid was uniformly applied to a polyethylene terephthalate film (T-100 available from Mitsubishi Plastics, Inc., thickness of 38 μm) as the base material by means of a bar-coating method so that the film thickness after drying would be a basis weight of 0.09 g/m$^2$, and thereafter dried at 130° C. for 1 minute. A release sheet having a release agent layer laminated on the base material was thereby obtained such that the release agent layer was covered by the base material so as not to be exposed to the air.

Example 2

A mixture of vinyl-modified silicone resin having at least two vinyl groups in the structure of polydimethylsiloxane (weight-average molecular weight: 1,100,000) as the first polydimethylsiloxane, polymethylhydrogensiloxane having at least two hydrosilyl groups in the structure of polydimethylsiloxane (weight-average molecular weight: 1,000) as the second polydimethylsiloxane, and vinyl-modified silicone resin having at least two vinyl groups in the structure of silicone resin (weight-average molecular weight: 10,000), was prepared as an addition reaction-type organopolysiloxane (release agent composition B) having a weight-average molecular weight of 583,000. A release sheet was produced in the same manner in Example 1 except that the release agent composition B was used in place of the release agent composition A in Example 1.

Example 3

A mixture of vinyl-modified silicone resin having at least two vinyl groups in the structure of polydimethylsiloxane (weight-average molecular weight: 1,100,000) as the first polydimethylsiloxane, polymethylhydrogensiloxane having at least two hydrosilyl groups in the structure of polydimethylsiloxane (weight-average molecular weight: 1,000) as the second polydimethylsiloxane, and vinyl-modified silicone resin having at least two vinyl groups in the structure of silicone resin, was prepared as an addition reaction-type organopolysiloxane (release agent composition C) having a weight-average molecular weight of 634,000. A release sheet was produced in the same manner in Example 1 except that the release agent composition C was used in place of the release agent composition A in Example 1.

Example 4

A mixture of vinyl-modified silicone resin having at least two vinyl groups in the structure of polydimethylsiloxane (weight-average molecular weight: 1,100,000) as the first polydimethylsiloxane, polymethylhydrogensiloxane having at least two hydrosilyl groups in the structure of polydimethylsiloxane (weight-average molecular weight: 1,000) as the second polydimethylsiloxane, and vinyl-modified silicone resin having at least two vinyl groups in the structure of silicone resin, was prepared as an addition reaction-type organopolysiloxane (release agent composition D) having a weight-average molecular weight of 658,000. A release sheet was produced in the same manner in Example 1 except that the release agent composition D was used in place of the release agent composition A in Example 1.

Example 5

A mixture of vinyl-modified silicone resin having at least two vinyl groups in the structure of polydimethylsiloxane (weight-average molecular weight: 1,100,000) as the first polydimethylsiloxane, polymethylhydrogensiloxane having at least two hydrosilyl groups in the structure of polydimethylsiloxane (weight-average molecular weight: 1,000) as the second polydimethylsiloxane, and vinyl-modified silicone resin having at least two vinyl groups in the structure of silicone resin, was prepared as an addition reaction-type organopolysiloxane (release agent composition E) having a weight-average molecular weight of 634,000. A release sheet was produced in the same manner in Example 1 except that the release agent composition E was used in place of the release agent composition A in Example 1.

Comparative Example 1 a mixture of phenyl-modified silicone resin having at least two vinyl groups in the structure of polydimethylsiloxane (weight-average molecular weight: 400,000) as the first polydimethylsiloxane and polymethylhydrogensiloxane having at least two hydrosilyl groups in the structure of polydimethylsiloxane (weight-average molecular weight: 1,000) as the second polydimethylsiloxane, was prepared as an addition reaction-type organopolysiloxane (release agent composition F) having a weight-average molecular weight of 344,000. A release sheet was produced in the same manner in Example 1 except that the release agent composition F was used in place of the release agent composition A in Example 1.

Comparative Example 2

A mixture of vinyl-modified silicone resin having at least two vinyl groups in the structure of polydimethylsiloxane (weight-average molecular weight: 1,100,000) as the first polydimethylsiloxane, polymethylhydrogensiloxane having at least two hydrosilyl groups in the structure of polydimethylsiloxane (weight-average molecular weight: 1,000) as the second polydimethylsiloxane, and vinyl-modified silicone resin having at least two vinyl groups in the structure of silicone resin, was prepared as an addition reaction-type organopolysiloxane (release agent composition G) having a weight-average molecular weight of 440,000. A release sheet was produced in the same manner in Example 1 except that the release agent composition G was used in place of the release agent composition A in Example 1.

Comparative Example 3

A mixture of vinyl-modified silicone resin having at least two vinyl groups in the structure of polydimethylsiloxane (weight-average molecular weight: 1,100,000) as the first polydimethylsiloxane, polymethylhydrogensiloxane having at least two hydrosilyl groups in the structure of polydimethylsiloxane (weight-average molecular weight: 1,000) as the second polydimethylsiloxane, and vinyl-modified silicone resin having at least two vinyl groups in the structure of silicone resin, was prepared as an addition reaction-type organopolysiloxane (release agent composition H) having a weight-average molecular weight of 696,000. A release sheet was produced in the same manner in Example 1 except that the release agent composition H was used in place of the release agent composition A in Example 1.

<Exemplary Test 1>

Each amount of the functional groups (vinyl groups/hydrosilyl groups) in the release agent compositions A to H used in the examples and the comparative examples was measured in accordance with the measuring method as below.

Deuterated chloroform (available from KANTO CHEMICAL CO., INC., pure grade of 99.8%) was added to a sample of polydimethylsiloxane so that the solid content of the sample of polydimethylsiloxane would be 10 mass %; pyrazine (PO554 available from Tokyo Chemical Industry Co., Ltd.) was added thereto so as to be of 0.3 mass % with respect to the sample of polydimethylsiloxane; and the mixture thus obtained was put into an NMR tube. For the sample put into the NMR tube, NMR measurement was performed using a nuclear magnetic resonator (NMR-Fourier 300 available from BRUKER CORPORATION) to quantitatively determine each amount (mmol) of the functional groups, i.e., each amount of vinyl groups and hydrosilyl groups.

From the measurement results as the above, a molar ratio (b/a) of the hydrosilyl groups (b) to the alkenyl groups (a) was calculated. Respective results are listed in Table 1.

<Exemplary Test 2>

In a clean room under a condition of class 10,000 (ISO class 7), a temperature of 23° C. and a humidity of 50% RH, the release sheet obtained in each of the examples and the comparative examples was suspended in the vertical direction to the ground surface, and exposed to the air for 1 day or 7 days.

Under a condition of a temperature of 23° C. and a humidity of 50% RH, a polyester pressure sensitive adhesive tape (available from NITTO DENKO CORPORATION, item number: No. 31B, width of 20 mm) was applied to the surface of the release agent layer of each of the release sheets without exposure to the air and the above release sheets exposed to the air by reciprocating a roller of 2 kg once, and a test piece for peeling force measurement was thus obtained.

After 30 minutes elapsed from the application of the polyester pressure sensitive adhesive tape, the peeling force was measured for the obtained test piece. A tensile tester available from SHIMADZU CORPORATION (item number: AG-IS 500N (load cell: 20 N)) was used to measure the peeling force.

Specifically, the side of the release sheet of the sample was fixed to a SUS plate; the polyester pressure sensitive adhesive tape was peeled off at a speed of 0.3 m/min while being bended at 180°; and the peeling force (mN/20 mm) at that time was measured. From the peeling force thus obtained, the peeling force rate of change (%) was calculated in accordance with the following equation:

peeling force rate of change (%)={(peeling force Y−peeling force X)/peeling force X}×100, where
the peeling force X: peeling force without exposure to the air, and
the peeling force Y: peeling force exposed to the air for 1 day or 7 days.
The results are listed in Table 2.

TABLE 1

| | Amount of functional groups (mmol) | | Molar ratio (b/a) |
|---|---|---|---|
| | Vinyl groups (a) | Hydrosilyl groups (b) | |
| Example 1 | 11.36 | 141.53 | 12.5 |
| Example 2 | 13.22 | 97.12 | 7.3 |
| Example 3 | 14.66 | 70.23 | 4.8 |
| Example 4 | 15.21 | 57.23 | 3.8 |
| Example 5 | 15.80 | 43.41 | 2.7 |
| Comparative Example 1 | 10.80 | 20.10 | 1.9 |
| Comparative Example 2 | 9.96 | 174.98 | 17.6 |
| Comparative Example 3 | 15.81 | 35.32 | 2.2 |

TABLE 2

| | Peeling force (mN/20 mm) | | | Peeling force rate of change (%) | |
|---|---|---|---|---|---|
| | Without exposure | Exposed for 1 day | Exposed for 7 days | Exposed for 1 day | Exposed for 7 days |
| Example 1 | 233 | 196 | 176 | −16 | −24 |
| Example 2 | 143 | 118 | 116 | −18 | −19 |
| Example 3 | 118 | 101 | 104 | −14 | −12 |
| Example 4 | 107 | 94 | 101 | −12 | −5 |
| Example 5 | 85 | 97 | 107 | 15 | 27 |
| Comparative Example 1 | 46 | 477 | 910 | 937 | 1878 |
| Comparative Example 2 | 343 | 293 | 236 | −15 | −31 |
| Comparative Example 3 | 52 | 92 | 134 | 78 | 158 |

As apparent from the results listed in Table 1 and Table 2, the release sheets using the release agent compositions satisfying the requirements of the present invention showed a much smaller peeling force rate of change due to exposure to the air.

INDUSTRIAL APPLICABILITY

The release sheet according to the present invention is suitably used as a release sheet of which the release agent layer is to be exposed to the air for a long time, such as for being subjected to back-split processing.

DESCRIPTION OF REFERENCE NUMERALS

1 . . . Release sheet
11 . . . Base material
12 . . . Release agent layer

The invention claimed is:

1. A release sheet comprising:
a base material and a release agent layer formed on at least one surface of the base material, wherein
the release agent layer is formed by using a release agent composition; the release agent composition contains a first polydimethylsiloxane having at least two alkenyl groups in one molecule and a second polydimethylsiloxane having at least two hydrosilyl groups in one molecule; the release agent composition contains 10.00 to 16.00 mmol of the alkenyl groups and 40.00 to 145.00 mmol of the hydrosilyl groups in a total of 30 g of the first polydimethylsiloxane and the second polydimethylsiloxane; and a molar ratio (b/a) of the hydrosilyl groups (b) to the alkenyl groups (a) is 2.5 to 14.5.

2. The release sheet as recited in claim 1, wherein a weight-average molecular weight of the first polydimethylsiloxane is 200,000 to 1,300,000 and a weight-average molecular weight of the second polydimethylsiloxane is 300 to 1,200.

3. The release sheet as recited in claim 1, wherein the release agent composition further contains a platinum-group metal-based compound as a catalyst.

4. The release sheet as recited in claim 1, wherein a peeling force rate of change represented by {(peeling force Y−peeling force X)/peeling force X}×100 is 30% or less, where the peeling force X is a 180° peeling force (mN/20 mm) of a polyester pressure sensitive adhesive tape No. 31B available from Nitto Denko Corporation from the release sheet in a state of no exposure to air, and the peeling force Y is a 180° peeling force (mN/20 mm) of a polyester pressure sensitive adhesive tape No. 31B available from Nitto Denko Corporation from the release sheet which has been exposed to air for 7 days in a clean room under a condition of class 10,000 (ISO class 7), a temperature of 23° C. and a humidity of 50% RH.

5. The release sheet as recited in claim 2, wherein the release agent composition further contains a platinum-group metal-based compound as a catalyst.

6. The release sheet as recited in claim 2, wherein a peeling force rate of change represented by {(peeling force Y−peeling force X)/peeling force X}×100 is 30% or less, where the peeling force X is a 180° peeling force (mN/20 mm) of a polyester pressure sensitive adhesive tape No. 31B available from Nitto Denko Corporation from the release sheet in a state of no exposure to air, and the peeling force Y is a 180° peeling force (mN/20 mm) of a polyester pressure sensitive adhesive tape No. 31B available from Nitto Denko Corporation from the release sheet which has been exposed to air for 7 days in a clean room under a condition of class 10,000 (ISO class 7), a temperature of 23° C. and a humidity of 50% RH.

7. The release sheet as recited in claim 3, wherein a peeling force rate of change represented by {(peeling force Y−peeling force X)/peeling force X}×100 is 30% or less, where the peeling force X is a 180° peeling force (mN/20 mm) of a polyester pressure sensitive adhesive tape No. 31B available from Nitto Denko Corporation from the release sheet in a state of no exposure to air, and the peeling force Y is a 180° peeling force (mN/20 mm) of a polyester pressure sensitive adhesive tape No. 31B available from Nitto Denko Corporation from the release sheet which has been exposed to air for 7 days in a clean room under a condition of class 10,000 (ISO class 7), a temperature of 23° C. and a humidity of 50% RH.

* * * * *